3,677,767
MOLASSES-UREA REACTION MIXTURES
Larry Cecil McNeff, Wayzata, Minn., assignor to Cargill, Incorporated, Minneapolis, Minn.
No Drawing. Filed Mar. 9, 1970, Ser. No. 17,946
Int. Cl. A23k *1/02, 1/22*
U.S. Cl. 99—6      14 Claims

ABSTRACT OF THE DISCLOSURE

An animal feed supplement is provided which comprises a reaction mixture of urea and molasses. The feed supplement provides improved nutrition for ruminant animals.

---

The present invention relates generally to feeding of ruminant animals and, more particularly, it relates to supplements for the feeding of such animals.

It is generally known that a ruminant animal derives its protein forming food from flora in the rumen which is disposed in advance of its stomach. The microorganisms in the rumen are known to first degrade a protein or non-protein nitrogen source, such as urea, to ammonia whereupon the ammonia is converted to microbial protein. A major portion of this microbial protein is then enzymatically degraded to amino acids.

The direct use of ammonia is not generaly feasible in the feeding of ruminant animals; and urea, when used as an immediate source of nitrogen in the animal feed ration, is difficult to control in the feeding of the animals. A problem occurs if urea breaks down too rapidly in that the system of the animal is not capable of utilizing the by-products, particularly ammonia, at too rapid a rate of production. In this connection, the presence of excessive amounts of ammonia in the system of the animal can be toxic or even lethal to the animal.

It has been recognized for some time that it is desirable to control the rate at which urea is broken down or hydrolyzed in the ruminant animal system and, in this connection, considerable work has been done at Kansas State University. This work has indicated the desirability of control of the rate of urea hydrolysis in the ruminant animal and has shown the effect of undue release of ammonia into the system of the animal. This work resulted in the development of a starch-controlled urea product which was prepared by finely grinding corn, sorghum, barley or other economical starch source, and mixing it with urea. The blend was cooked under high pressure and extruded. As a result of the cooking the starch in the grain was gelatinized and when the extruded product was fed to the animal, usually in granular form, the rate of release of ammonia was reduced and improved feeding results were noted.

Various other arrangements have been made for the feeding of non-protein-nitrogen (NPN) to animals through the use of materials which include a nitrogen source and which retard the release of ammonia from the nitrogen source. Letters Pat. 2,612,497 teaches the reaction of urea with certain monosaccharides such as glucose, galactose, mannose and fructose to provide a ureide. This Letters Patent also discloses that the urea can be combined with disaccharide sugars such as can sugar, maltose and lactose to also provide a ureide product.

It is further known to mix urea with molasses and phosphoric acid to provide a palatable feed product. This is taught in Letters Pat. 2,748,001.

A number of prior art patents disclose the coating or reaction of urea with various materials in order to provide slow release of urea in to the environment.

While the metabolism of urea in the rumen system has been recognized and the desirability of controlled release of urea, and therefore ammonia, into the ruminant animal's system is known, the best results have not yet been achieved and this invention is directed to the provision of an improved feed supplement for feeding of ruminant animals.

A particular object of this invention is the provision of an improved feed supplement for ruminant animals. A more particular object of the invention is the provision of a feed supplement comprising a reaction mixture of urea and a molasses under particular conditions.

A still more particular object of the invention is the provision of a feed supplement for ruminant animals which is a reaction mixture of urea and a molasses system having inherent buffering capacity.

A still further object of this invention is the provision of an improved process for manufacturing a feed supplement for ruminant animals.

Another object of the invention is to provide an improved process for providing non-protein-nitrogen compounds which make possible better assimilation in the rumen.

The accomplishment of these objects of this invention will be understood more readily by reference to the following description of the invention.

In general, the invention provides a reaction mixture of urea and a molasses having an inherent buffering capacity. The reaction mixture is to be distinguished from a simple mixture comprising molasses and urea which mixture does not provide the desired results of this invention and, in this connection, such simple mixture has substantially increased toxicity over the reaction mixture of the invention. The reaction mixture is also to be distinguished from the product of the reaction of monosaccharide and disaccharide sugars and urea. Such reaction products do not provide the equivalent urease resistant protein compounds as those provided by the reaction mixture of this invention.

The molasses should have an inherent buffering capacity of more than .03, buffering capacity being defined herein as the pounds of 66° Baumé sulfuric acid per pound of molasses solids to decrease the pH from about 5.0 to 2.0.

In the practice of the method of the invention, the urea is reacted with a molasses having inherent buffering capacity in its system in the presence of an acid catalyst in order to provide the reaction mixture of the invention. The inherent buffering capacity may be provided by the source material or by the process utilized in treating the source material. The molasses should be derived from beets, corn, cane or wood. Such molasses have systems which contain buffering mixtures which are functional in the reaction of the invention. While some of the buffering salts occurring in these molasses are known and are analyzable, the artificial provision of these buffering salts has not provided the most desired results of this invention. Furthermore, sugar systems which are supplemented with buffering salts do not provide the results of the invention, accordingly, in order to achieve the results of the invention, the molasses should be derived from corn, beets, cane or wood or other source which provides molasses with inherent buffering capacity. Thus, various molasses sources may provide buffering systems having inherent capacity which may be used.

The acid catalyst is desirably phosphoric acid and, in the practice of the process of the invention, the acid is added to a urea-molasses mixture to achieve a pH between about 1.5 and 3.0. At higher pH values, the results of the invention are not readily achieved and at pH values below 1.5 unwanted side reactions occur and undue cost accrues. In the latter connection, the higher acid conditions tend to accelerate the breakdown or hydrolysis of urea with formation of carbon dioxide which interferes with processing. The phosphoric acid appears to provide further buffering action in the recation and gives the most desired results of the invention. However, sulfuric acid may be utilized as the acid catalyst and will more economically provide the desired pH level. However, the use of sulfuric acid provides somewhat less urease-resistant protein at equivalent acid conditions as compared to the use of phosphoric acid, but the economics of the process permit advantageous use of sulfuric acid. Of course, mixtures of sulfuric acid and phosphoric acid may be utilized to provide results intermediate the use of phosphoric acid and sulfuric acid. The use of mixtures can also provide a desired balance of phosphorus and sulfur in feed. Acids other than phosphoric and sulfuric may be used but they are not generally feasible for animal feeding purposes.

The mole ratio of molasses to urea is important for purposes of achieving the desired results of the invention. This mole ratio is based upon the molasses, measured as TSI (total sugars as invert). The TSI is determined as follows: The molasses is analyzed for reducing sugars, measured as invert, and the weight of reducing sugars is divided by 180 to determine the mole value which, as used herein, is the TSI.

The mole ratio of TSI to urea should be above about 0.75:1. The extent of conversion of urea to urease resistant protein is a direct function of this mole ratio and the desired extent of conversion is not obtained outside of this range. However, at mole ratios above about 3:1 the nitrogen content is too low from a practical feeding standpoint although desired conversion is achieved. The preferred mole ratio of TSI to urea is about 2:1. It is to be noted that at comparable mole ratios of TSI to urea, the conversion of urea to urease resistant protein is considerably greater in the molasses reaction system than is provided in simple sugar reaction systems.

It has been determined that in order to obtain the desired feeding results in ruminant animals, the percent conversion of total protein to urease resistant protein should preferably be in excess of about 30 percent, although desirable results and increased feed efficiency may be obtained when the percent conversion is as low as 20 percent. At lower conversion percentages, less desired feeding results are obtained. It is to be noted that the desired feeding results are a function of the extent of conversion and are not particularly a function of the level of urease resistant protein in the feed supplement. More particularly, even though higher levels of urease resistant protein may be present in the feed less desirable feeding results may be obtained than in a feed with a lower amount of urease resistant protein but having a higher conversion rate.

The percent conversion is determined by measuring the percent total protein and subtracting the percent urea protein, the difference being then divided by the percent total protein and multiplied by 100. The result is the percent conversion and may be stated as follows:

Percent conversion
$$=\frac{\%\text{ total protein}-\%\text{ urea protein}}{\%\text{ total protein}}\times 100$$

The percent total protein is measured by determining the percent nitrogen by the Kjeldahl method and multiplying by 6.25. The percent urea protein is determined by ascertaining the percent nitrogen by the urease test (AOAC, 10th ed., 22.024) and multiplying by 6.25.

As before indicated, the percent conversion should preferably exceed about 30 percent in order to achieve the desired feeding results of this invention.

The reaction is desirably carried out at a temperature of between about 65° C. and 85° C. and the desired percent conversion will be achieved in a period of from five to ten hours. Longer periods may be utilized but such extended times do not provide significantly improved results. The reaction is preferably practiced at a temperature of 70° C. to 80° C. in a time from six to eight hours. In this connection, the reaction is carried out under caramelizing conditions which results in some polymerization and darkening of the product. The viscosity of the system should increase by a factor of at least 20 percent during the reaction. On the other hand, the viscosity should not be unduly increased to a point where the product does not readily flow. It is important to note this darkening and increase in viscosity in order for the reaction product to achieve the results of the invention.

The indicated temperature range is significant and at temperatures below 65° C., the desired percent conversion is not achieved. On the other hand, at temperatures above about 85° C. there is undue darkening, i.e., caramelization, and the product may become so thick that it becomes difficult to handle.

After the reaction has occurred, the product is desirably neutralized to a pH of 4.0 to 7.0. Such adjustment of pH is necessary for feeding purposes and appropriate metabolism in ruminant animals. The neutralization can be effected by the addition of sodium hydroxide, calcium hydroxide, ammonia or other neutralizing agent which is compatible with the animal system.

The reaction mixture of the invention, when fed to ruminant animals, provides better growth results than is provided by the feeding of mixtures of urea and molasses. Furthermore, beter feeding results are obtained with the reaction mixture than are obtained by feeding the reaction product of simple sugars in solution and urea.

A more clear understanding of the invention will be obtained by consideration of the following specific examples.

EXAMPLE 1

14,500 pounds of a concentrated molasses-urea mixture is charged to a vessel of 14,000 gallon capacity. The mixture comprised 38.5 percent urea. The concentrate protein level measures 108.4 percent total protein. 28,400 pounds of 87.5 degree Brix cane molasses is then mixed with the concentrate. The cane molasses has a buffering capacity of about .055. The ratio of TSI to urea is about 1.2:1. The admixture is vigorously agitated with compressed air while heat is applied within the vessel. The temperature of the mixture reaches 50° C. whereupon 85 percent concentrated phosphoric acid is added to the vessel. 1,900 pounds of phosphoric acid is pumped into the vessel over a period of about 20 minutes with agitation of the admixture. This acid addition causes an increase in temperature.

1,600 pounds of 66° Baumé sulfuric acid is added in four increments to the vessel with the resultant change in pH being as follows:

| Increment | Pounds | pH |
|---|---|---|
| Initial | 0 | 4.5 |
| 1 | 800 | 3.1 |
| 2 | 400 | 2.6 |
| 3 | 200 | 2.3 |
| 4 | 200 | 2.1 |

With the addition of sulfuric acid there is a sudden temperature rise due to the heat of dissolution and the temperature increases about 15° C. in about 40 minutes time.

The contents of the vessel are then heated to 75° C. and the temperature is held for a period of eight hours. The total percent protein of the reaction mixture is about 37.8 percent and the percent urea protein is about 14.8 percent. The percent conversion, accordingly, is about 61 percent.

The reaction mixture is then neutralized with 50 percent caustic soda (NaOH) with the following three increments being added to achieve the indicated pH values:

| Increment | Pounds | pH |
|---|---|---|
| Initial | 0 | 2.8 |
| 1 | 700 | 3.6 |
| 2 | 700 | 4.1 |
| 3 | 1,500 | 4.5 |

During the addition of caustic, there is about a 15° C. rise in temperature and some 1,800 pounds of water is added to standardize the product. The product is further cooled and is ready for use.

The product may be combined with mineral supplements and vitamin additions.

EXAMPLE 2

A reaction mixture of the invention was prepared by mixing 570 pounds of high Brix cane molasses with 100 pounds of urea. This provided a TSI to urea ratio of about 1:1. Eighteen pounds of 66° Baumé sulfuric acid was added to the molasses-urea mixture and this resulted in a reduction in pH to 3.0. The admixture was heated to 170° F. and held for an eight hour period.

The total protein in the resulting reaction mixture was 45.3 percent and the urease resistant protein was 19.3 percent so that the percent conversion was 45 percent.

The reaction mixture was mixed with ammonium polyphosphate to raise the level of phosphorus to 1 percent based on the solids in the reaction mixture. The pH of the mixture was 5.2 so that it was not necessary to add any neutralizing agent.

The reaction mixture was diluted with water, molasses, minerals, and vitamins to provide a feed supplement.

EXAMPLE 3

In order to compare the use of phosphoric acid with the use of sulfuric acid in the manufacture of the reaction mixture, cane molasses and urea were mixed together at a TSI to urea ratio of 2:1. The acid was added to give a pH, as indicated in the table below, and the reaction was carried out at 75° for the times indicated in the table.

TABLE I.—AVERAGE PERCENT CONVERSION AS A FUNCTION OF PHOSPHORIC ACID AND SULFURIC ACID CATALYZED CANE MOLASSES-UREA REACTIONS CARRIED OUT AT 75° C.

| | | Sulfuric acid catalyzed reaction | | Phosphoric acid catalyzed reaction | |
|---|---|---|---|---|---|
| | Time (hrs.) | Total percent protein | Percent conversion | Total percent protein | Percent conversion |
| pH: | | | | | |
| 2.0 | 0 | 26.4 | | 27.5 | |
| | 8 | 25.7 | 72.8 | 25.0 | 77.6 |
| 3.0 | 0 | 24.3 | | 23.6 | |
| | 8 | 24.8 | 23.4 | 24.0 | 43.4 |

It will be noted, from the foregoing table, that the percent conversion is increased in the use of phosphoric acid and this is particularly notable at a pH of 3.0.

EXAMPLE 4

This example is set forth to show the effect of acidity, as measured by pH on the percent conversion. A mixture of cane molasses and urea was prepared having a TSI to urea ratio of 2:1 and sulfuric acid was added in the amounts indicated below to obtain the specified pH. The reaction was carried out at 75° C. in an eight hour period. The table indicates the percent conversion as a function of pH and it will be noted that the percent conversion is inversely proportional to the pH of the system.

TABLE II.—PERCENT CONVERSION PRODUCED IN 8 HOURS FROM A REACTION OF A 2/1 MOLE RATIO OF TSI/UREA AT 75° C. AS A FUNCTION OF THE INITIAL pH ᵃ OF THE SYSTEM

| Initial pH | Percent conversion of total protein [b] | Conc. $H_2SO_4$ needed to attain pH (percent of total weight) |
|---|---|---|
| 2 | 65.6 | 3.88 |
| 3 | 37.8 | 2.88 |
| 4 | 27.1 | 0.675 |
| 5.5 | 16.4 | None |

[a] Initial pH was adjusted with conc. $H_2SO_4$.
[b] Total protein of final mix was about 25 percent in each reaction system.

EXAMPLE 5

This example shows the effect of the mole ratio of TSI to urea upon the percent conversion. The cane molasses was mixed with urea at the indicated ratio in the following table and the pH was adjusted to 2.0 with sulfuric acid. The reactions were carried out for the indicated times at 75° C.

TABLE III.—PERCENT CONVERSION AS A FUNCTION OF THE MOLE RATIO OF TSI IN THE MOLASSES TO UREA FOR REACTIONS CARRIED OUT OVER VARIOUS PERIODS OF TIME AT 75° C. AND AN INITIAL pH OF 2.0

| TSI/urea (mole ratio) | Reaction time (hours) | Total percent protein | Percent conversion |
|---|---|---|---|
| 1/2 | 2 | 72.4 | 25.3 |
| | 4 | 72.6 | 26.7 |
| | 8 | 72.7 | 28.0 |
| | 24 | 73.2 | 30.8 |
| 1/1 | 2 | 43.7 | 26.5 |
| | 4 | 43.3 | 41.4 |
| | 8 | 43.3 | 45.8 |
| | 24 | 43.6 | 48.2 |
| 2/1 | 2 | 24.9 | 41.8 |
| | 4 | 24.9 | 53.8 |
| | 8 | 23.9 | 65.7 |
| | 24 | 24.9 | 69.0 |

It will be noted from the foregoing table that the percent conversion is a function of mole ratio of TSI to urea and that quite extended reaction times do not substantially increase the percent conversion. In this connection, the most extended reaction times resulted in only slight increase in the percent conversion.

EXAMPLE 6

This example was carried out to show the difference in result which is obtained between a molasses-urea mixture and a glucose-urea mixture. The reaction was carried out at a TSI to urea ratio, in each case, of 2:1 over a period of 24 hours at a temperature of 75° C. The results are shown in the following table.

TABLE IV

| Reaction system | Initial pH | Final pH | Total percent protein of final product | Percent conversion |
|---|---|---|---|---|
| Molasses/urea | 3.0 | 3.9 | 24.3 | 52 |
| Glucose/urea | 3.0 | 7.5 | 22.9 | 16.9 |

The lack of buffering in the glucose-urea system is shown by the substantial rise in pH during the reaction. It will also be noted that the percent conversion is very much reduced in the glucose-urea system.

EXAMPLE 7

This example is set forth to illustrate the advantage in feeding the reaction mixture to ruminant animals. For purposes of this example, three feed supplements were prepared as set forth in the following table.

TABLE V.—EXPERIMENTAL CATTLE SUPPLEMENTS

|  | A (percent) | B (percent) | C (percent) |
|---|---|---|---|
| Ration designation: |  |  |  |
| Midds | 18.00 |  |  |
| Soybean meal (44% protein) | 51.77 |  |  |
| Soybean meal (48% protein) | 11.00 |  |  |
| Alfalfa meal (17% protein) | 7.50 |  |  |
| Molasses (79.5 Brix) | 5.00 | 74.864 | 74.864 |
| Fat | 1.00 |  |  |
| Urea |  | 10.00 | 10.00 |
| Salt | 1.50 |  |  |
| Biofos [a] | 1.00 |  |  |
| Limestone | 3.00 |  |  |
| $NH_4$ polyphosphate (11-37-0) [b] |  | 5.00 | 5.00 |
| Vitamin premix | [c] .028 | [d] 0.011 | [d] 0.011 |
| Mineral mix | [e] 0.200 | [f] 0.125 | [f] 0.125 |
| Water |  | 10.00 | 10.00 |
| Nutrients: |  |  |  |
| Fat | 2.53 |  |  |
| Fiber | 7.48 |  |  |
| Ca | 1.70 | 0.56 | 0.56 |
| Phosphorus | 0.75 | 0.75 | 0.75 |
| Sulfur | 0.41 | 0.41 | 0.41 |
| Urease resistant protein | 32.32 | 1.4 | 13.2 |
| Urea and ammoniacal protein |  | 31.9 | 18.8 |

[a] Mixture of mono- and di-calcium phosphates; 17.5% Ca, 21.0% P.
[b] 11% nitrogen and 37% $P_2O_5$.
[c] Vitamin A, 172,000 I.U./g.; Vitamin $D_2$, 20,300 I.U./g.; Vitamin E, 7,150 I.U./lb.
[d] Vitamin A, 200,000 U.S.P./g.; Vitamin $D_2$, 50,000 U.S.P./g.; Vitamin E, 45,360 I.U./lb.
[e] Ca, 7.65%; I, 0.24%; Co, 0.04%; Cu, 1.00%; Fe, 12.00%; Mn, 12.00%; Zn, 15.00%; Mg, 0.28%; K, 0.25%.
[f] Co, 0.0815%; Cu, 3.95%; Fe, 4.2%; Mn, 5.6%; Zn, 1.82%; Mg, 1.71%.

Animals comprising 48 steers were treated in a finishing phase over a period of 140 days. All animals were implanted with 30 mg. of diethylstilbestrol at the start of the finishing phase of the feeding experiment. In the finishing phase each steer was fed ground corn (ad lib.), 2 pounds of chopped brome alfalfa hay and 2 pounds of protein supplement per day. Table VI indicates the quantity of daily feed for each pen of 8 animals during the finishing phase.

TABLE VI.—DAILY FEED PER PEN FOR FINISHING PHASE

| Pen numbers | Supplements | Ground corn | Chopped brome alfalfa hay |
|---|---|---|---|
| 1 and 4 | 16 pounds A | Full feed | 16 pounds. |
| 2 and 5 | 16 pounds B | do | Do. |
| 3 and 6 | 16 pounds C | do | Do. |

Adequate mineral supplement of the following composition was made available free choice in each pen:

Ca, 20.9%; S, 1.4%; K, 2.5%; Mg, 1.4%; Salt, 25.0%

Supplement C utilized in the finishing phase was produced from an acid catalyzed, elevated temperature reaction between molasses and urea (2.5/1 mole ratio of TSI/urea). This system was then neutralized with NaOH to a pH of 5.6 and subsequently diluted with molasses, water, ammonia polyphosphate, vitamins and minerals to a 32.0% protein supplement. The total protein of this final product consisted of 41% urease resistant protein and 59% urea and ammoniacal protein. Thus, the conversion of urea to urease resistant protein was 45 percent.

The results during the finishing phase are set forth in the table below.

The foregoing feeding tests show that the reaction mixture provides improved results as a supplement in cattle rations.

The reaction mixture of this invention provides a relatively low concentration of ammonia in the rumen fluid upon feeding to animals. In this connection, the concentration of ammonia in the rumen fluid is less than 50 percent of the maximum amount reached in the fluid when compared to the feeding of urea-molasses mixtures in the amounts which are equivalent to those in the reaction mixture. This maximum concentration of ammonia in the rumen fluid, which is normally achieved in less than one hour, has been found to be less than the maximum concentration of ammonia in the rumen fluid when the animals are fed with other urea products which are adapted for slower release of ammonia.

The fact that less maximum amounts of ammonia occur in the rumen fluid permits the feeding of higher amounts of nitrogen in the feed, and particularly permits the feeding of substantially greater amounts of the reaction mixture than can be had with the feeding of mixtures of urea and molasses. It has been found that the reaction mixture is about one-half as toxic as urea-molasses mixtures and is much less likely to be lethal to the animal. Thus, the reaction mixture in liquid form is a substantial improvement over the liquid urea-molasses mixtures being presently marketed.

The reaction mixture, while involving some additional cost in its manufacture, provides a much more economical and simple manner for providing a nitrogen source for the animal. The reaction mixture can be more economically fed, as indicated above, than most nutrient systems for providing weight gain in animals.

The various features of the invention which are believed to be new are set forth in the following claims.

I claim:

1. An animal feed supplement comprising a reaction product of molasses and urea obtained by reacting urea and molasses at a temperature above 65° C. and at a pH below about 4, the mole ratio of TSI to urea in the initial reactants being above 0.75:1 and the percent conversion of total equivalent protein in the reaction product to equivalent protein not subject to conversion by urease being above about 20 percent.

2. The animal feed supplement of claim 1 in which the molasses has an inherent buffering capacity of more than .03.

3. The animal feed supplement of claim 1 in which the mole ratio of TSI to urea in the initial reactants is between about 0.75 and 3:1.

4. The animal feed supplement of claim 1 in which the mole ratio of TSI to urea in the initial reactants is about 2:1.

5. The animal feed supplement of claim 1 in which the reaction mixture is caramelized and flowable.

6. A process for the manufacture of a liquid animal feed supplement comprising providing a mixture of molasses having an inherent buffering capacity of at least 0.03 and urea, said mixture having a mole ratio of TSI to urea above about 0.75:1, and reacting said mixture at a temperature above about 65° C. and at a pH below about 4.0 for a period of time sufficient to provide a reaction mixture wherein the conversion of total equivalent protein to equivalent protein not subject to conversion by urease is at least about 20 percent.

7. The process of claim 6 in which the reaction is carried out at a temperature between about 65° C. and 85° C.

8. The process of claim 7 in which the reaction is con-

TABLE VII.—PERFORMANCE OVER FINISHING PHASE OF FEEDING EXPERIMENT (140 DAYS)

| Supplement ration | Pen numbers | Number of animals | Days | Average starting weight (lbs.) | Average final weight | Average daily gain | Feed per pound of gain | Feed per day | Feed cost per pound of gain (cents) |
|---|---|---|---|---|---|---|---|---|---|
| A | 1 | 8 | 140 | 670.4 | 1,101.2 | 3.08 | 7.25 | 22.32 | 17.05 |
| A | 4 | 8 | 140 | 685.2 | 1,119.5 | 3.10 | 7.40 | 22.94 | 17.48 |
| Average of total |  | 16 | 140 | 677.8 | 1,110.4 | 3.09 | 7.32 | 22.63 | 17.26 |
| B | 2 | 8 | 140 | 650.7 | 1,085.0 | 2.97 | 7.54 | 22.35 | 16.41 |
| B | 5 | 8 | 140 | 655.2 | 1,076.1 | 3.01 | 7.54 | 22.66 | 16.40 |
| Average of total |  | 16 | 140 | 653.0 | 1,080.3 | 2.99 | 7.54 | 22.52 | 16.41 |
| C | 3 | 8 | 140 | 653.1 | 1,100.6 | 3.20 | 6.97 | 22.28 | 15.33 |
| C | 6 | 8 | 140 | 661.2 | 1,106.6 | 3.18 | 7.21 | 22.92 | 15.82 |
| Average of total |  | 16 | 140 | 657.2 | 1,103.6 | 3.19 | 7.09 | 22.60 | 15.57 | tinued until the viscosity of the mixture has increased 20 percent and the reaction mixture is flowable.

9. The process of claim 6 in which the mole ratio of TSI to urea in the reactants is between about .75:1 and 3:1.

10. The process of claim 6 in which the pH is between about 1.5 and 3.0.

11. The process of claim 6 in which the pH is adjusted to between pH 1.5 and 3.0 by addition of sulfuric acid, phosphoric acid or mixtures thereof.

12. The process of claim 9 in which the pH is adjusted in the range of 1.5 to 3.0.

13. The process of claim 11 in which the pH adjustment is effected with phosphoric acid.

14. A method for providing improved growth in ruminant animals which comprises feeding a reaction product of molasses and urea obtained by reacting urea and molasses at a temperature above 65° C. and at a pH below about 4 in which the reaction product has at least 30 percent conversion of total equivalent protein to equivalent protein not subject to conversion by urease, a pH in the range of 4.0 to 7.0, and a mole ratio of TSI to urea in the initial reactants of about 2:1.

References Cited

UNITED STATES PATENTS

| | | | |
|---|---|---|---|
| 2,807,546 | 9/1957 | Anderson et al. | 99—6 |
| 2,853,385 | 9/1958 | Wiggins | 99—2 |
| 1,950,701 | 3/1934 | Spangenberg | 71—26 |
| 3,573,924 | 4/1971 | Zarow | 99—6 |
| 3,165,413 | 1/1965 | Weber et al. | 99—6 |

NORMAN YUDKOFF, Primary Examiner

C. P. RIBANDO, Assistant Examiner

U.S. Cl. X.R.

71—26, 28; 99—2 N

UNITED STATES PATENT OFFICE
CERTIFICATE OF CORRECTION

Patent No. 3,677,767          Dated  July 18, 1972

Inventor(s)  Larry Cecil McNeff

It is certified that error appears in the above-identified patent and that said Letters Patent are hereby corrected as shown below:

Column 6, line 62, "52%" should be --59%--

Column 6, line 63, "16.9%" should be --16.2%--

Column 8, line 44, "0.75 and 3:1" should be --0.75:1 and 3:1--

Signed and sealed this 9th day of January 1973.

(SEAL)
Attest:

EDWARD M. FLETCHER, JR.                    ROBERT GOTTSCHALK
Attesting Officer                          Commissioner of Patents